Patented Apr. 9, 1929.

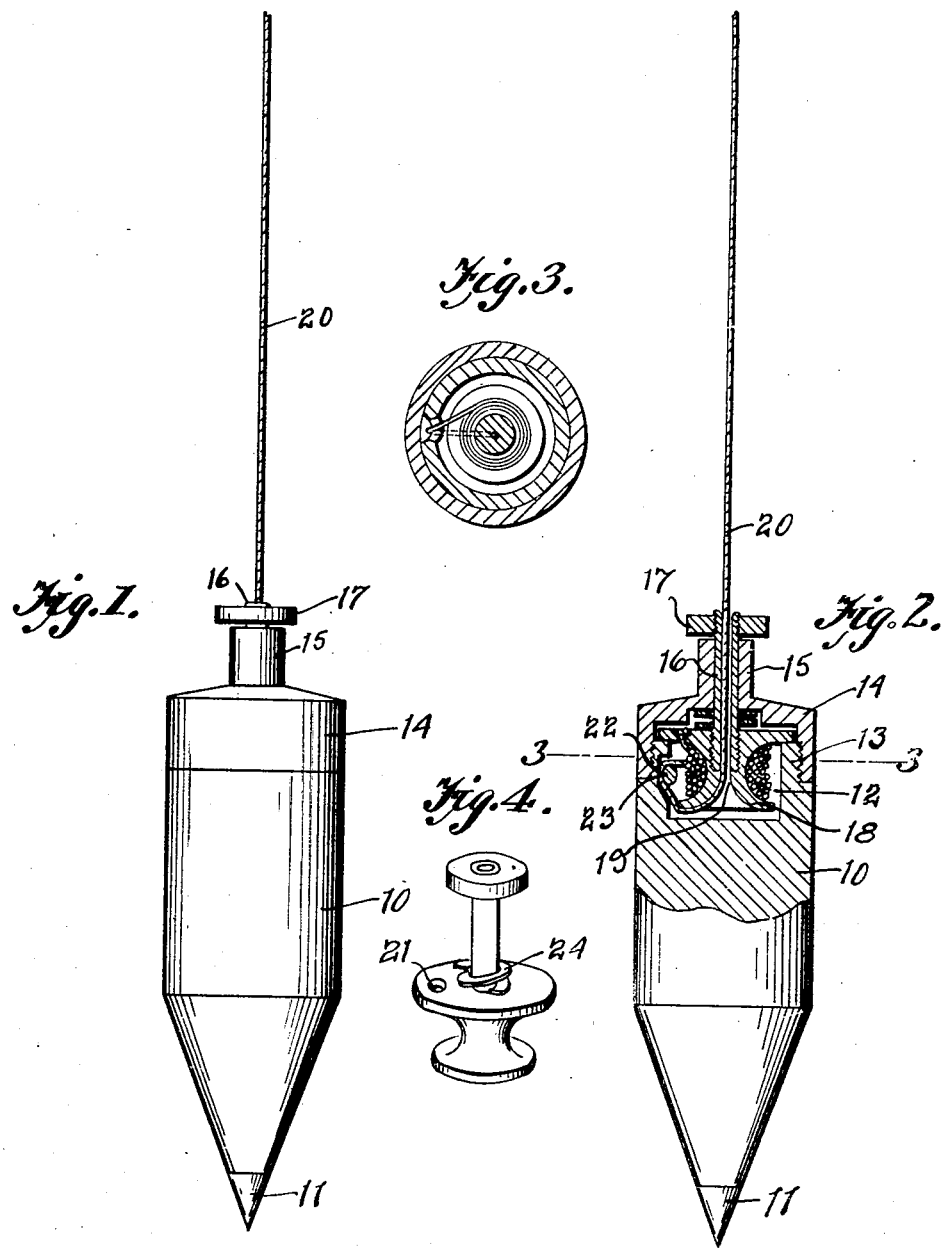

1,708,778

UNITED STATES PATENT OFFICE.

VICTOR THOMAS POWELL, OF SACRAMENTO, CALIFORNIA.

PLUMB BOB.

Application filed February 12, 1926. Serial No. 87,868.

This invention relates to plumb bobs and has for its object the provision of a device of this character equipped with a suspension string or cord and provided with means whereby the cord may be lengthened or shortened to meet different working conditions.

Another object of the invention is to provide a plumb bob equipped internally with means for effecting shortening of the suspension cord, the means being entirely enclosed but operable from the exterior.

An additional object is to provide a device of this character which will be simple and inexpensive in manufacture, easy to adjust, positive in action, efficient aand durable in service, and a general improvement in the art.

With the above and other objects and advantages in view, the invention consists in the details of construction and arrangement of parts to be hereinafter more fully described and claimed, and illustrated in the accompanying drawing in which:

Figure 1 is a side elevation of the device,

Figure 2 is a view partly in elevation and partly in longitudinal section,

Figure 3 is a cross section on the line 3—3 of Figure 2, and

Figure 4 is a perspective view of the drum removed.

Referring more particularly to the drawings I have shown the device as comprising a body 10 which is preferably cylindrical and which terminates in a point 11 as is customary in plumb bobs. The upper end of the body is chambered at 12 and is formed with a threaded portion 13 of reduced size upon which is screwed a cap 14 formed with an extension 15 within which is rotatably mounted a tube 16 carrying a knob or button 17 above the extension 15.

Located within the chamber 12 and threaded onto or otherwise secured to the lower end of the tube is a spool or drum 18 having a bore 19 therein alining with the bore of the tube 16. The drum or spool is peripherally grooved or channeled for the accommodation of the suspension cord 20 which is threaded through the tube 16 and bore 19 and which has one end passed through a hole 21 in the spool or drum and knotted or otherwise secured against displacement. At one side the reduced portion 13 is apertured at 22 and formed with a guide 23 over which the cord is trained as clearly shown in Figure 2.

The upper portion of the spool or drum is of sufficient diameter to extend partly over the end of the reduced portion 13 upon which it bears, friction being assisted by a spring washer 24 which encircles the tube 16 and which bears against the underside of the cap and the top of the drum or spool.

In the use of the device, it is apparent that by grasping the knob or button 17 and turning it in one direction or the other the spool or drum will be rotated to wind in or pay out the cord, the length thereof being consequently regulable at will. Naturally this will be of distinct advantage in certain lines of work as will be apparent to those skilled in the art.

While I have shown and described a preferred embodiment of the invention, it should be understood that I reserve the right to make such changes in the form, construction and arrangement of parts as will not depart from the spirit of the invention or the scope of the subjoined claims.

Having thus described the invention, I claim:

1. A plumb bob comprising a body having a reduced portion at its upper end and formed with a chamber, the reduced portion being apertured to define a guide, a cap detachably engaged upon said reduced portion, a tube rotatable through the cap and carrying an operating button, a spool secured to the tube within the chamber, a cord threaded through the tube and secured to and wrapped about the spool, the upper portion of the spool bearing upon said extension, and a spring interposed between the cap and the spool.

2. A plumb bob comprising a body having a reduced threaded portion at its upper end and terminating in its lower end in a point, the upper portion of the body being formed with a chamber, a cap screwed upon said threaded reduced portion and provided with an axial extension, a tube rotatably mounted within said extension and carrying an operating knob exteriorly thereof, a spool secured on said tube within said chamber, said spool having an upper flange engaging upon the upper end of said reduced threaded portion, spring means interposed between the spool and the cap for urging said flange into frictional engagement with said reduced portion said spool being adapted to have secured thereto a cord that extends through said tube and a guide for said cord.

In testimony whereof I affix my signature.

VICTOR THOMAS POWELL.